(12) United States Patent
Gillette et al.

(10) Patent No.: US 7,562,419 B2
(45) Date of Patent: Jul. 21, 2009

(54) PROCESS FOR PURIFICATION OF COTTON LINTERS

(75) Inventors: Paul C. Gillette, Newark, DE (US); Charles Ernest Hall, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 556 days.

(21) Appl. No.: 11/179,301

(22) Filed: Jul. 13, 2005

(65) Prior Publication Data

US 2006/0010669 A1 Jan. 19, 2006

(51) Int. Cl.
*D01B 1/04* (2006.01)
(52) U.S. Cl. .......................................... 19/41
(58) Field of Classification Search ............... 19/41–47
See application file for complete search history.

(56) References Cited

U.S. PATENT DOCUMENTS

| 661,166 | A | | 11/1900 | Boyd | |
|---|---|---|---|---|---|
| 2,004,731 | A | | 6/1935 | Reynell et al. | 19/44 |
| 2,210,016 | A | | 8/1940 | Ware | 19/67 |
| 2,632,924 | A | | 3/1953 | Bertram et al. | 19/90 |
| 3,815,178 | A | | 6/1974 | Goldman | |
| 4,486,459 | A | * | 12/1984 | Thompson | 426/634 |
| 6,524,442 | B2 | * | 2/2003 | Tanner et al. | 162/261 |
| 2005/0228174 | A1 | * | 10/2005 | Gillette et al. | 536/86 |
| 2006/0016568 | A1 | * | 1/2006 | Gillette et al. | 162/95 |
| 2007/0249825 | A1 | * | 10/2007 | Sau | 536/86 |

OTHER PUBLICATIONS www.camwire.com/meshtabl/10.htm, Jan. 14, 2002.*

* cited by examiner

*Primary Examiner*—Shaun R Hurley
(74) *Attorney, Agent, or Firm*—Robert O'Flynn O'Brien; Joanne Mary Fobare Rossi

(57) ABSTRACT

An improved process for the purification of raw cotton linters includes the cutting of a first, second, third or mill run cut raw cotton linters to a particle size that passes through a 2,500 micrometer screen and then mechanically separating the linters into clean and unclean fractions. The clean fraction contains purified cut raw cotton linters and the unclean fraction contains the impurities.

11 Claims, No Drawings

PROCESS FOR PURIFICATION OF COTTON LINTERS

FIELD OF INVENTION

This invention relates to improved process for the purification of raw cotton linters that is based upon the separation of impurities from linter fibers contained in cut raw cotton linters.

BACKGROUND OF INVENTION

Cotton linters have long been recognized as providing cellulose furnishes suitable for the production of premium cellulose derivatives. Raw cotton linters have been considered an excellent source of high molecular weight cellulose for over 80 years. Raw cotton linters, commonly referred to as "linters", are short fiber residues left on the cottonseed after the longer staple ("lint") fibers are removed by ginning. Linters are shorter, thicker, and more colored fibers than staple fibers. Linters are removed from cottonseeds using a number of technologies including linter saws and abrasive grinding methods, both of which yield suitable materials. Depending on the number of passes used to remove the linters from the cottonseed, they are called "first-cut", "second-cut" and "third-cut" raw cotton linters. If the linters are removed in one pass or first- and second-cut linters are manually blended in a weight ratio of approximately 1:4, the resulting material is called "mill runs". Mill runs and first-cut raw cotton linters are used in medical and cosmetic applications as well as to make upholstery, mattresses, etc. while second cut cotton linters are typically used to manufacture purified cotton linters or chemical cotton. In general, first-cut cotton linters contain less non-cellulosic impurities than do second-cut cotton linters. The amount of hemicellulose, lignin or colored impurities and foreign matter in the various types of raw cotton linters increases in the following order: First-cut<second-cut<third-cut. Typically, the cellulose content of raw cotton linters is about 69-78 wt % as measured by the American Oil Chemists' Society (AOCS) "bB 3-47: Cellulose Yield Pressure-Cook Method".

In the past, the use of cotton linters in chemical processes was only after extensive mechanical and chemical cleaning to yield a high purity furnish. Purified cellulose obtained from raw cotton linters is called chemical cotton or purified cotton linters. Given the commercial significance of cotton, it is not surprising that many mechanical separation processes have been developed over the past century to separate lint and linters from other contaminants. In contrast to the present invention these previous methods have utilized uncut fibers make the separation process very difficult due to a number of factors which will be discuss in more detail.

Until recently linters obtained from cottonseed oil producers underwent extensive dry cleaning as well as chemical purification prior to their use in chemical reactions. A previous invention (U.S. Ser. No. 10/822,926, Gillette et al., Filed Apr. 13, 2004 entitled "Improved Raw Cut Cotton Linters, Method of Making, and Uses Thereof") demonstrated that cellulose derivatives suitable for a variety of applications could be produced from unpurified "raw" linters. For a number of applications, such as those that are color sensitive or command the highest molecular weight products, it is desirable to perform some purification of the raw cotton linters. Additional benefits from partial purification or cleaning of raw linters may be realized during cellulose ether manufacture. These include, but are not limited to, more efficient use of derivatizing reagents and reduced contamination of both slurry process diluent liquids as well as purification solvents.

Heretofore suppliers of highly purified linters have sought to preserve linters fiber length as much as possible since this attribute is desirable for many of their customer's applications. Several examples of equipment designed to clean raw cotton linters are presented in (U.S. Pat. No. 661,166, R. R. Boyd, filed Nov. 6, 1990, entitled "Process of Treating Cotton-Waste"; U.S. Pat. No. 2,004,731, C. H. R. and A. J. V Ware, filed Jun. 11, 1935, entitled "Means and Method for Defibrating"; U.S. Pat. No. 2,210,016, A. J. V. Ware, filed Aug. 6, 1940, entitled "Cleaner for Cotton Linters"; U.S. Pat. No. 2,632,924, L. L. Bertram et al., filed Mar. 31, 1953, entitled "Apparatus for Cleaning Fibrous Materials; and U.S. Pat. No. 3,815,178, M. A. Goldman, filed Jun. 11, 1974, entitled "Cotton Linter Refining Process and Apparatus"). Examples of commercially available equipment are the Carver Hi-Cel.™ linter cleaner and the Continental Eagle Industrial Metal Products LC-410D lint cleaner. In addition, the suppliers of highly purified linters typically provide their product in heavy gauge paper sheet form, the production of which is greatly facilitated by maintaining linters fiber length. As will be discussed, long fibers are not only unnecessary, but also undesired for the production of cellulose derivatives.

SUMMARY OF THE INVENTION

The present invention is directed to a process for purifying raw cotton linters comprising
a) cutting a first, second, third cut, or mill runs raw cotton linters to a particle size that passes through a 2,500 micrometer screen, and
b) mechanically separating the cut raw cotton linters into clean and unclean fractions,
whereby the clean fraction contains purified cut raw linters and the unclean fraction contains the impurities.

DETAILED DESCRIPTION OF THE INVENTION

It has been surprisingly found that the present invention provides a simple, yet unique, approach for mechanically cleaning raw cotton linters that is both efficient and economical as compared to prior art methods of cleaning linters. The high bulk density, good flow characteristics, reactivity, increased purity, and high molecular weight of the resulting cellulose of the present invention is especially attractive to manufacturers of cellulose derivatives.

In the present invention it has been unexpectedly found that the purity of cut raw cotton linters can be improved through a variety of particle size-based separation techniques. Consequently, such purification improves the quality of raw cotton linters and the chemical derivative products derived therefrom. The separation of impurities in cut raw cotton linters has a number of benefits over separation approaches utilizing uncut raw cotton linters.

In cleaning uncut raw cotton linters manufacturers are faced with several practical difficulties: Compressed bales of these materials contain entangled fibers with entrapped impurities. Prior to cutting several types of impurities are present, including relatively fine powder as well as larger hull fragments, often with linters still attached as found in the native plant. As a result, the separation problem requires machinery capable of dislodging the impurities followed by separation of both small and large impurities from the desired linter fibers. The mechanical shaking and beating operations generated by some separation devices can lead to fires. Since some of the impurities include linter fibers that are physically attached, such processes are both difficult and prone to discard a fraction of otherwise usable linter fibers.

In accordance with the present invention, the raw cotton linters that have been removed from bales of the linters are in the form of first, second, or third cut or mill run cotton linters. The bales contain some or all of the impurities associated with the cottonseed from which the linters are cut. In the case of bales containing raw linters that have been previously processed by conventional mechanical dry cleaning means the present invention can be utilized to further improve purity. An important step in this invention is the initial cutting of the raw cotton linters with cotton linters cutting equipment that precisely and accurately cut the linters to the desired particle size length distribution. The desired particle size length distribution will depend on the desired end use. Generally, the raw cotton linters should be cut to particle sizes that pass through a 2,500 micrometer screen opening. Other screen openings for particle size length distributions that may be desirable by end use manufacturers are 2,000, 1,500, 500, 250, 150, and 75 micrometers. If a high molecular weight product is desired, then care should be taken during the cutting operation to minimize molecular weight degradation. Elevated temperatures during cutting can present problems in this regard. Through the use of appropriate raw linters cutter feed rates as well as air, liquid nitrogen, and/or water cooling, molecular weight degradation can be mitigated.

Physical separation of impurities in cut raw cotton linters has a number of benefits relative to the uncut raw cotton linters purification case. Cutting represents a unit operation already required for the commercial production of cellulose derivatives. In addition to completely dislodging the impurities from the entangled fibers, cutting also reduces the size of large impurities. In the case of hull fragments still having adhering fibers, cutting serves to remove the fibers thereby permitting recovery of material that would otherwise be discarded by a conventional dry cleaning process. Cut raw cotton linters essentially contain a mixture of well-separated individual raw cotton linter fibers and finely ground powdered impurities. Such a mixture is considerably easier to purify than the entangled fibrous mixture with entrapped small and large impurities presented by uncut raw cotton linters. The process of the present invention has been found to be especially effective in reducing both inorganic and high lignin-containing components from the cut raw linter fibers.

After the raw cotton linters in the present invention are cut to the desired size, the particles are mechanically separated which is also an important step in this simple physical cleaning or purifying process. The cut linters are then separated into clean and unclean fractions The desired level of purity will depend upon the specific end-use requirements. Purity may be assessed using a variety of means, Methods described in the "Standard Procedures" section of the present invention provide techniques yielding an indication of noncellulosic components. The clean fraction contains the purified cut raw linters and the unclean fraction contains the impurities. This mechanical separation can be carried out using one or a series of progressively finer sieves or by an air classifier. Other size-based separation techniques suitable for the present invention will be apparent to those skilled in the art.

In accordance with the present invention, on a commercial scale, separation of linter fibers from finely ground impurities can be achieved using a variety of techniques. For example, Wiessner Air Engineering GmbH (Bayreuth, Germany) manufactures equipment in which an air stream containing the cut linters: impurity mixture is brought into contact with a rotating screen. Fine particles pass through the screen where they are trapped on a rotating drum filter that is periodically cleaned. Linter fibers are collected on the rotating screen and are subsequently removed by a vacuum slit traversing the radius of the screen. Other equipment suitable for use in the invention include appropriately designed cyclone separators including more sophisticated equipment designs incorporating additional particle size classification methodologies. An example of the latter case is an air classifier. Specific examples of suitable air classifiers include, but are not limited to, Hosokawa Micron Separators, Hosokawa Alpine Turboplex® Ultrafine Classifiers, Netzsch Condux® Air Classifier CFS, and Bauermeister BM-ACL air classifiers. The specific operating conditions required to obtain an optimal separation depend upon the design characteristics of the specific air classifier as well as the specific properties of the cut raw cotton linters. Other examples of air classifiers as well as general guidelines for their operation may be found in a review article by R. Nied and H. Horlamus (Air Classifying in W. Gerthartz (ed.), Ullmann's Encyclopedia of Industrial Chemistry—Fifth Edition, (VCH Verlagsgesellschaft mbH, Weinheim, Germany: 1988), Vol. B-2, p. 17.1). Online particle size analyzers such as the Insitex X On-Line Sizer from Malvern Instruments Limited may be utilized in conjunction with the air classifier to provide continuous feedback to the air classifier operation, thereby providing greater control over the separation process.

The present invention is further illustrated in the following examples, wherein all parts or percentages mentioned are by weight unless otherwise indicated. These examples are given only by way of illustration and are not intended to limit the invention except as set forth in the claims.

Standard Procedures

1. Sulfate Ash Measurement

The sample was charred over a low Bunsen flame to remove the bulk of the volatile matter, cooled, and moistened with sulfuric acid. The excess of acid was then evaporated from the treated charred mass, and the ashing completed in the normal way as described below. The sulfate ash is calculated to percentage.

Procedure

A 2 to 3 g sample was weighed to the nearest 0.001 g, into a previously ignited and tared platinum or porcelain dish of about 75 mL capacity.

The dish was then ignited over a low Bunsen flame and allowed to burn, with only occasional application of heat, until most of the carbonaceous material was burned off. The entire residue was cooled and moistened with 1:1 sulfuric acid. The excess acid then was evaporated over a low Bunsen flame slowly so as to avoid spattering, and the ignition was completed by placing in a muffle at 800 to 850° C. for 30 minutes or until the ash was free of carbon. The sample was then cooled, desiccated, and weighed.

Calculation $$\frac{\text{Grams of Residue} \times 100}{\text{Grams of Sample}} = \% \text{ Ash as } Na_2SO_4 \quad \text{Eq. (1.1)}$$

Duplicate results should agree within 0.05%.

2. Moisture Content Measurement

Sample moisture content was determined by elevated temperature weight loss according to the following procedure:

Apparatus
(1) Weighing dish, glass or aluminum, with cover, 50 mm diameter, ~25 mm high.
(2) Oven, maintained at 105±1° C.

Procedure

About 5 g of sample was weighed, to the nearest 0.001 g, into a tared dish. The uncovered dish was placed in an oven at 105° C. for 3 hours. At the end of the heating period, the dish was removed from the oven, the cover was immediately replaced, and the dish was cooled in a desiccator to ambient temperature and subsequently weighed.

Calculation $$\frac{\text{Grams loss in weight} \times 100}{\text{Grams of sample}} \text{\% Moisture} \qquad \text{Eq. (2.1)}$$

3. Hexane Solubles Determination

This method measures the hexane soluble fraction of cellulose using a jacketed Soxhlet extraction with hexane. After a 3-hour extraction, the solvent was evaporated and the nonvolatile residue was weighed. The method is similar to the American Oil Chemists Society Method Bb 2-38, which uses a continuous reflux extraction with petroleum ether.

The cellulose sample must be in a dry, finely divided, fibrous form.

Apparatus
1. Cellulose extraction thimbles, 33×80 mm—available from Fisher Scientific, Inc., Cat. No. 2800338 (Whatman), or equivalent.
2. Glass wool, borosilicate—ibid., Cat. No. 11-388, or equivalent.
3. Round bottom flask, 500 mL, with 24/40 ground joint.
4. Boiling chips, alumina granules—ibid., Cat. No. B365-250, or equivalent
5. Allihn condenser with 45/50 ground joint—ibid., Cat. No. 09-551-10B (Kimble), or equivalent.
6. Soxhlet extractor, jacketed, with 45/50 and 24/40 ground joints—ibid., Cat. No. 09-553B (Kimble), or equivalent.
7. Heating mantle with insulated heater and controller, 500 mL—ibid., Cat. No. 11-474-105D (Electrothermal), or equivalent. A heating mantle with integral power control is recommended for better heating control.
8. Vial, 4 dram, borosilicate glass—ibid., Cat. No. 03-339-21F, or equivalent. Vials with a capacity of 15-25 mL also may be used.
9. Pasteur Pipet, 9 inch, with bulb—ibid., Cat. No. 13-678-20A, or equivalent.
10. Graduated cylinder, 250 mL.
11. Drying oven, capable of operating at 105° C.
12. Balance, capable of weighing to the nearest 0.0001 g.
13. Clamps and ring stand or support for the extraction apparatus.

Reagents
1. Hexane (hexanes), high purity—available from Fisher Scientific, Inc., Cat. No. H303-1, or equivalent. A grade suitable for organic residue analysis must be used. ACS Reagent grade material may not be suitable due to its higher evaporation residue specification.
2. Nitrogen—low pressure purified, dry nitrogen from a central source or a cylinder and regulator. Attach an adjustable valve for control of the flow and small diameter inert tubing to direct the flow into the flasks and vials.

Procedure
1. 3.5 to 4 g of sample was weighed, to the nearest 0.0001 g, into a 33×80 mm cellulose extraction thimble. The sample was covered with a loose wad of glass wool.
2. 150 mL of hexane, Reagent 1, were transfer to a 500 mL round bottom flask with a graduated cylinder and two boiling chips were added.
3. The thimble was placed in the Soxhlet extractor, and the extractor was attached to the flask and a water-cooled condenser. The flask was placed in the heating mantle with a power control, and the entire apparatus was supported with suitable clamps and ring stand or other support. All connections were tightened to ensure of being leak free.
NOTE: All operations involving hexane were carried our in a fume hood. No spark sources, for example, variable transformers or electrical outlets, were allowed in use in the hood when hexane was present. The heating mantle controller was plugged into an outlet outside the hood.
4. Power was applied to the heating mantle and adjusted until the hexane came to a moderate boil and the extractor cycled every two to four minutes.
5. The samples were extracted for a total of three hours, then the heating mantle was disconnected from the power outlet.
6. The apparatus was allowed to cool and the flask was removed.
7. The hexane was evaporated by directing a stream of dry nitrogen onto the surface of the liquid. The stream was adjusted to produce a dimple on the surface of the liquid, but was not allowed to splash the liquid. The solution was evaporated just to dryness.
8. A dry 4 dram vial was tared to the nearest 0.0001 g.
9. The flask was rinse with approximately 2 mL of hexane. The outer surface of the flask was warmed with hot water and the hexane was swirled in the flask to dissolve the residue.
10. The hexane was carefully transferred to the vial with a Pasteur pipette.
11. Steps 9 and 10 were repeated with four additional 2 mL portions of hexane.
12. The hexane was evaporated at room temperature in the hood by applying a stream of dry nitrogen to the surface of the liquid. The stream was adjusted to produce a dimple on the surface of the liquid, but was not allowed to splash the liquid. The solution was evaporated until completely dry.
13. After all of the hexane was evaporated, the vial containing the residue was dried in a 105° C. oven for one hour.
14. The vial and residue were reweighed to the nearest 0.0001 g.
15. The percent of hexane solubles was calculated using Equation 3.1.
16. When further analysis of the sample was required, it was allowed to air dry in the thimble in a hood.
17. Percent of hexane solubles was calculated using Equation 3.1.

Calculation $$\frac{W_2 - W_1}{W_s} \times 100 = \text{\% Hexane solubles} \qquad \text{Eq. (3.1)}$$

Where:
$W_1$=weight of vial, g
$W_2$=weight of vial and dried residue, g
$W_s$=weight of sample, g

4. Sulfuric Acid Insolubles Measurements

This method determined the insoluble fraction remaining after treatment with two concentrations of sulfuric acid. A weighed sample was treated with 72% (w/w) sulfuric acid for four hours at room temperature, then the mixture was diluted to 1.2 M acid strength and heated at reflux for four hours. The residue was washed free of acid and weighed.

If hexane solubles are to be performed on the same sample, the dried material remaining after that analysis should be used for determination of sulfuric acid insolubles, to prevent overestimation of total impurities.

Apparatus
1. Beaker, 50 mL, borosilicate.
2. Graduated cylinders, 25 and 250 mL.
3. Stirring bar, Teflon coated, one inch.
4. Magnetic stirrer.
5. Erlenmeyer flask, 500 mL, with 29/26 or 29/42 ground glass joint—available from Ace Glass, Inc, 1430 North West Blvd, Vineland, N.J. 08362-0688, Cat. No. 6965-38, or equivalent.
6. Allihn condenser with 29/42 ground glass joint, ibid., Cat No. 5945-24, or equivalent.
7. Boiling chips, alumina granules—available from Fisher Scientific, Inc., Cat. No. B365-250, or equivalent.
8. Hot plate, with adjustable power settings. A multi-heater unit may be used for several simultaneous determinations.
9. Filtering crucible, Gooch, porcelain, 25 mL—available from Fisher Scientific, Inc., Cat. No. 08-195E (Coors), or equivalent.
10. Crucible holder, Walter type—ibid., Cat. No. 08-285, or equivalent.
11. Filtering flask, 1000 mL. Attach to a source of vacuum with suitable rubber tubing.
12. Filter paper, glass fiber, 2.1 cm diameter—available from Fisher Scientific, Inc., Cat. No. 09-874-10 (Whatman type GF/A), or equivalent.
13. Oven, drying, capable of operating at 105° C.
14. Balance, capable of weighing to the nearest 0.0001 g.
15. Desiccator. Charge with calcium sulfate desiccant, Reagent 3.

Reagents
1. Sulfuric acid, reagent grade.
2. Sulfuric acid, 72% solution—635 mL of sulfuric acid, Reagent 1, were carefully added with cooling, to 365 mL of distilled or deionized water. The solution was cooled to room temperature before using.
3. Calcium sulfate desiccant (Drierite)—use any suitable grade.

Procedure
1. A 1 to 1.1 g portion of sample was weighed, to the nearest 0.0001 g, into a 50 mL beaker.
2. 20 mL of 72% sulfuric acid, Reagent 2, were added with a graduated cylinder to the beaker
3. A stirring bar was added to the beaker and stirred for 4 hours with a magnetic stirrer at room temperature with sufficient stirring to wet the sample. During the first part of the stirring, the sample was thoroughly wetted with reagent. When necessary, a stirring rod was used to push the sample into the reagent, taking care not to lose any of the sample.
4. The solution was cautiously transferred into a 500 mL flask by washing with a total of 180 mL of distilled water.
5. The flask was attached to a reflux condenser and the mixture was refluxed on the hot plate for 4 hours.
6. While the sample was refluxing, a glass fiber filter paper placed in a Gooch crucible, wetted with distilled water, and vacuum was applied to remove the water and set the filter in place.
7. The crucible and filter were dried for one hour in a 105° C. oven.
8. The crucible and filter were weighed to the nearest 0.0001 g.
9. The reflux mixture was cooled and the solution was filtered through the crucible under vacuum.
10. The flask was rinsed with four 10 mL portions of distilled water and then added to the filter. Made sure that all insoluble material was transferred.
11. The crucible was rinsed with 10 mL of water and filtered. As much liquid as possible was removed by suction.
12. The crucible and residue were dried in a 105° C. oven for two hours.
13. The crucible was cooled in a desiccator and weighed to the nearest 0.0001 g.
14. Percent of hexane solubles was calculated using Equation 4.1.

Calculation $$\frac{(W_2 - W_1)}{W_s} \times 100 = \% \text{ Sulfuric acid insolubles} \qquad \text{Eq. (4.1)}$$

Where:
$W_1$=weight of the crucible and filter, g
$W_2$=weight of the crucible, filter, and dried residue, g
$W_s$=weight of the sample, g

5. Cellulose Content Calculation

Cellulose content (dry basis) was calculated as being the balance of the material less impurities as determined by the preceding methods. It was calculated using the following equation:

$$\frac{(1-H_2O)*(1-\text{Ash}) + (1-C_6H_{14})*(1-H_2SO_4) - 1}{(1-H_2O)} = \% \text{ Cellulose} \qquad \text{Eq. (5.1)}$$

Where:
$H_2O$=% moisture as determined by standard procedure 2
Ash=% sulfate ash as determined by standard procedure 1
$C_6H_{14}$=% hexane solubles as standard procedure 3
$H_2SO_4$=% sulfuric acid insolubles as determined by standard procedure 4

EXAMPLES

Example 1

A sample of second cut linters obtained from Planters Cotton Oil Mill, Incorporated in Pine Bluff, Arkansas was initially cut using a Netzsch Condux® CS150/100-2 cutter. All cut material initially passed through a 200 μm screen in the cutter. A series of progressively finer sieves (from 850 to 38 micrometer screen openings) was used to separate impurities from the cellulose. Eight inch diameter stainless steel USA Standard Testing Sieves conforming to ASTM E11 specifications manufactured by W.S. Tyler were used for the measurements. Tests were performed by placing a known quantity (~100 g) of cut raw linters onto the coarsest sieve and then using a W.S. Tyler Model RX-24 Portable Sieve Shaker to shake the stacked sieves for 20 minutes. The resulting size fractions were weighed and their chemical composition determined using the Standard Procedures. To improve precision this procedure was repeated three times and the corresponding weight fractions for each run summed.

Table 1 provides quantitative data reflecting the benefits of the present invention. As can be seen from Table 1, the finer size particle fractions contain higher levels of impurities as indicated by progressively higher sulfate ash and sulfuric acid insoluble values. Sulfate ash and sulfuric acid insolubles are indicative of inorganic impurities and lignin, respectively. Hexane soluble data remain relatively constant for the different fractions.

Without cutting less than 0.25% of an uncut raw linters sample passes through a 850 micrometer screen after shaking for 20 minutes with a sieve shaker.

Example 2

A Hosokawa Micron MS-1 air classifier was used to separate the impurities in second cut raw linters that had been previously cut by a rotary knife cutter. In this example weighed fractions of 91% and 9% were obtained for the "fine" and "coarse" fractions, respectively. The Standard Procedures were used to evaluate the samples. After calculating the "Cellulose (Dry Basis)" using equation 5.1, the "Impurities (Dry Basis)" was calculated as 100% minus the "Cellulose (Dry Basis)". For each analysis the "ΔFine" and "ΔCoarse" values reflecting changes relative to the starting material were computed as follows:

$$\frac{\% \ Analysis_{Fine} - \% \ Analysis_{starting \ Material}}{\% \ Analysis_{starting \ material}} = \Delta Fine \quad \text{Eq. (6.1)}$$

$$\frac{\% \ Analysis_{Coarse} - \% \ Analysis_{starting \ Material}}{\% \ Analysis_{starting \ material}} = \Delta Coarse \quad \text{Eq. (6.2)}$$

Using these equations it is apparent that positive and negative values reflect increases or reductions, respectively, in the relative quantities of materials reflected by a given analysis. It is evident from the sulfate ash and sulfuric acid insolubles analytical data presented in Table 2 that air classification concentrates a substantial fraction of the impurities in the "coarse" fraction. The changes are particularly significant when one considers that air classification reduces the "dry" impurities in the clean ("fine") fraction by ~21%.

TABLE 2

Separation of Impurities in Cut Second Cut Linters using an Air Classifier

| Analysis | Starting Material | Air-Classified Fractions | | | |
|---|---|---|---|---|---|
| | | "Fine" | "Coarse" | Δ"Fine" | Δ"Coarse" |
| Moisture | 4.43% | 3.76% | 6.41% | −15.12% | 44.70% |
| Sulfate Ash | 2.07% | 1.74% | 3.98% | −15.94% | 92.27% |
| Hexane Solubles | 3.21% | 3.25% | 1.49% | 1.25% | −53.58% |
| $H_2SO_4$ Insolubles | 6.64% | 4.41% | 25.90% | −33.58% | 290.06% |
| Cellulose (Dry Basis) | 87.85% | 90.45% | 67.17% | 2.96% | −23.54% |
| Impurities (Dry Basis) | 12.15% | 9.55% | 32.83% | −21.42% | 170.16% |

What is claimed:

1. A process for purifying raw cotton linters comprising
   a) cutting a first, second, third, or mill run cut raw cotton linters torn particle size that passes through a 2,500 micrometer screen, and
   b) mechanically separating the cut raw cotton linters into clean and unclean fractions,
   whereby the clean fraction contains purified cut raw linters and the unclean fraction contains the impurities, wherein the mechanically separating step (b) is performed by either one or more progressively finer sieves, or an air classifier.

2. The process of claim 1, wherein the number of progressively finer sieves is two.

3. The process of claim 1, wherein the number of progressively finer sieves is four.

4. The process of claim 1, wherein the number of progressively finer sieves is six.

5. The process of claim 1, wherein the air classifier is controlled using feedback from an online particle size analyzer.

6. The process of claim 1, wherein the cuffing step (a) produces a particle size that passes through en opening of 2000 micrometer.

7. The process of claim 1, wherein the cutting step (a) produces a particle size that passes through an opening of 1500 micrometer.

8. The process of claim 1, wherein the cutting step (a) produces a particle size that passes through an opening of 500 micrometer.

TABLE 1

Sieve Separation of Cut Second Cut Raw Cotton Linters

| Sample Number | Sieve # | Screen Opening (μm) | % of Total | Cumulative Fraction | Bulk Density (g/100 ml) | Particle Size Range (μm) | Moisture | Sulfate Ash | Hexane Solubles | $H_2SO_4$ Insolubles | Cellulose (Dry Basis) |
|---|---|---|---|---|---|---|---|---|---|---|---|
| 1 | 20 | 850 | 0.01% | 0.01% | — | >850 | | | | | |
| 2 | 50 | 300 | 50.26% | 50.27% | 18.60 | >300 < 850 | 6.08% | 1.35% | 3.48% | 4.93% | 89.88% |
| 3 | 100 | 150 | 31.37% | 81.65% | 23.89 | >150 < 300 | 6.51% | 1.59% | 3.38% | 6.83% | 87.74% |
| 4 | 200 | 75 | 11.72% | 93.37% | 35.67 | >75 < 150 | 7.91% | 2.69% | 3.40% | 14.60% | 78.30% |
| 5 | 325 | 45 | 5.55% | 98.91% | 37.19 | >45 < 75 | 8.14% | 3.22% | 4.68% | 15.50% | 75.60% |
| 6 | 400 | 38 | 1.06% | 99.97% | — | >38 < 45 | | | | | |
| 7 | Pan | — | 0.03% | 100.00% | — | <38 | | | | | |
| Analysis of Unsieved Starting Material | | | | | 22.35 | | 3.94% | 2.03% | 3.60% | 7.12% | 87.08% |

9. The process of claim 1, wherein the cutting step (a) produces a particle size that passes through an opening of 250 micrometer.

10. The process of claim 1, wherein the cutting step (a) produces a particle size that passes through an opening of 150 micrometer.

11. The process of claim 1, wherein the cutting step (a) produces a particle size that passes through an opening of 75 micrometer.

* * * * *